United States Patent
Hage-Hassan et al.

(10) Patent No.: US 9,050,914 B2
(45) Date of Patent: Jun. 9, 2015

(54) VEHICLE SEAT

(71) Applicant: TS TECH CO., LTD., Saitama (JP)

(72) Inventors: Souheil Hage-Hassan, Reynoldsburg, OH (US); Eiji Toba, Reynoldsburg, OH (US)

(73) Assignee: TS Tech Co., Ltd., Saitama (JP)

( * ) Notice: Subject to any disclaimer, the term of this patent is extended or adjusted under 35 U.S.C. 154(b) by 152 days.

(21) Appl. No.: 13/731,269

(22) Filed: Dec. 31, 2012

(65) Prior Publication Data
US 2014/0183916 A1 Jul. 3, 2014

(51) Int. Cl.
*B60N 2/30* (2006.01)
*B60N 2/36* (2006.01)

(52) U.S. Cl.
CPC ............ *B60N 2/3045* (2013.01); *B60N 2/3013* (2013.01); *B60N 2/305* (2013.01); *B60N 2/36* (2013.01)

(58) Field of Classification Search
USPC ............ 297/331, 335, 333, 326, 327, 452.18, 297/284.11, 321, 344.15, 344.17, 344.1, 297/378.1
See application file for complete search history.

(56) References Cited

U.S. PATENT DOCUMENTS

| 4,357,005 | A | * | 11/1982 | Bourke | 267/144 |
| 5,154,402 | A | * | 10/1992 | Hill et al. | 267/133 |
| 6,375,255 | B1 | * | 4/2002 | Maruta et al. | 297/15 |
| 6,561,583 | B2 | * | 5/2003 | Glaser | 297/325 |
| 6,827,394 | B2 | * | 12/2004 | Watanabe et al. | 297/15 |
| 7,121,624 | B2 | * | 10/2006 | Pejathaya et al. | 297/378.12 |
| 7,293,835 | B2 | * | 11/2007 | Yudovich | 297/335 |
| 7,926,876 | B2 | * | 4/2011 | Zadai et al. | 297/344.17 |
| 8,052,216 | B2 | * | 11/2011 | Nathan et al. | 297/378.12 |
| 8,251,450 | B2 | * | 8/2012 | Carroll et al. | 297/334 |
| 8,408,648 | B2 | * | 4/2013 | Champ | 297/335 |
| 8,616,645 | B2 | * | 12/2013 | Ito | 297/344.17 |
| 8,684,459 | B2 | * | 4/2014 | Teufel et al. | 297/284.11 |
| 8,720,996 | B2 | * | 5/2014 | Nazione et al. | 297/336 |
| 2001/0050501 | A1 | * | 12/2001 | Fourrey et al. | 297/331 |
| 2003/0011229 | A1 | * | 1/2003 | Bell | 297/344.17 |
| 2005/0077770 | A1 | * | 4/2005 | Lang et al. | 297/331 |
| 2006/0061174 | A1 | * | 3/2006 | Saberan | 297/331 |
| 2006/0152058 | A1 | * | 7/2006 | Pejathaya et al. | 297/378.12 |

(Continued)

FOREIGN PATENT DOCUMENTS

| JP | H01-123736 U | 8/1989 |
| JP | 11-301318 A | 11/1999 |

(Continued)

OTHER PUBLICATIONS

International Search Report issued for PCT/JP2013/085236 (Mar. 18, 2014).

*Primary Examiner* — David R Dunn
*Assistant Examiner* — Timothy J Brindley
(74) *Attorney, Agent, or Firm* — Drinker Biddle & Reath LLP

(57) ABSTRACT

Provided is a seat structure capable of suppressing the size increase of a vehicle seat provided with a rotation member that rotates to stow a seat body. In a vehicle seat that includes a stowable seat body and a link member attached to a seat cushion, the link member rotates about a rotation shaft provided along the width direction of the seat body to shift the seat cushion to a stowed position in stowing the seat body. Further, the link member is positioned below the seat cushion and is attached to the center portion of the seat cushion in the width direction.

11 Claims, 10 Drawing Sheets

(56) References Cited

U.S. PATENT DOCUMENTS

2006/0284464 A1* 12/2006 Soditch et al. ............... 297/331
2007/0090663 A1* 4/2007 Ewers et al. ............... 296/65.09
2007/0246985 A1* 10/2007 Sahi ............................. 297/331
2010/0072800 A1* 3/2010 Weber et al. ............. 297/344.15
2010/0289313 A1* 11/2010 Moegling et al. ............. 297/332
2011/0049953 A1* 3/2011 Champ ......................... 297/326
2011/0062761 A1* 3/2011 Seibold et al. ........... 297/378.14
2011/0163582 A1* 7/2011 Nazione et al. ............... 297/334

FOREIGN PATENT DOCUMENTS

| | | |
|---|---|---|
| JP | 2001-130296 A | 5/2001 |
| JP | 2003-531767 A | 10/2003 |
| JP | 2005-313745 A | 11/2005 |
| JP | 2006-264347 A | 10/2006 |
| JP | 2007-196741 A | 8/2007 |
| JP | 2009-202813 A | 9/2009 |
| JP | 2011-245990 A | 12/2011 |

* cited by examiner

FRONT ⟵⟶ REAR

FRONT ⟷ REAR

WIDTH DIRECTION

WIDTH DIRECTION

VEHICLE SEAT

BACKGROUND

Disclosed herein is a vehicle seat including a stowable seat body, and particularly, a vehicle seat further including a rotation member that rotates to shift a seat cushion to a stowed position in stowing the seat body.

An example of a vehicle seat with a stowable seat body is a seat with a rotation member that rotates to shift a seat cushion to a stowed position in stowing the seat body. In the seat with such a configuration, the aforementioned rotation member is provided below the seat cushion, and is connected to a predetermined portion of the seat cushion. Further, the seat cushion shifts toward the stowed position along with the rotation of the rotation member.

As a specific example, in a vehicle seat disclosed in Japanese Patent Document No. H01-123736 ("the '736 Document"), a hinge bracket is provided as the aforementioned rotation member. When the hinge bracket rotates, the locking operation to the seat cushion is released to enable the seat cushion to shift forward. As a result, it is possible to shift the seat cushion to the stowed position.

However, there is a concern that the size of the vehicle seat may increase due to the installation of the rotation member. In particular, in the vehicle seat disclosed in the '736 Document, the hinge bracket is attached to both end portions of the seat cushion in the width direction of the vehicle seat. In such a structure, there is a possibility that the size of the vehicle seat may increase in the width direction of the vehicle seat.

SUMMARY

Therefore, various embodiments of the present invention address the aforementioned problems, and realize a seat structure capable of suppressing the size increase of a vehicle seat provided with a rotation member that rotates to stow a seat body.

The aforementioned problems are solved by a vehicle seat with a seat cushion on which a passenger sits, the vehicle seat including: a stowable seat body, and a rotation member that is attached to the seat cushion to rotate about a rotation shaft provided along the width direction of the seat body for shifting the seat cushion to a stowed position in stowing the seat body; in which the rotation member is positioned below the seat cushion and is attached to a center portion of the seat cushion in the width direction.

According to the vehicle seat with the aforementioned configuration, the rotation member can be stowed in an area where the seat cushion is disposed in the width direction of the vehicle seat. That is, in the vehicle seat with the aforementioned configuration, the rotation member can be disposed to not protrude outside both ends of the seat cushion in the width direction. Accordingly, it is possible to suppress the size increase of the vehicle seat though the rotation member is provided.

Further, in the vehicle seat, a plurality of the rotation members may be attached to the center portion of the seat cushion in the width direction while being separated from each other in the width direction. The vehicle seat may further include a connection member that extends in the width direction to connect the plurality of rotation members to each other. The seat cushion may include a seat cushion frame that has a gap between front and rear end portions in the front-back direction of the seat body, and a frame side connector that is disposed in the gap to connect the front and rear end portions of the seat cushion frame to each other. The connection member may be disposed to stride the position where the frame side connector is disposed in the width direction.

In the aforementioned configuration, in the seat cushion frame, the rigidity of the portion provided with the frame side connector is higher than that of the other portion. Further, since the connection member is disposed to stride the position where the frame side connector is disposed, the attachment rigidity of the connection member to the rotation member attached to the connection member can be improved.

Further, in the aforementioned configuration, each of the plurality of rotation members may include a lower rotation member piece that rotates about a lower rotation shaft as the rotation shaft, and an upper rotation member piece that is connected to the lower rotation member piece through a connection shaft provided along the lower rotation shaft to rotate about the connection shaft. The vehicle seat may further include: a lower support member that is fixed to the lower position of the seat cushion frame to rotatably support the lower rotation member piece about the lower rotation shaft, and an upper support member that is fixed to the seat cushion frame to rotatably support the upper rotation member piece about an upper rotation shaft provided along the connection shaft. The lower rotation member piece may rotate rearward about the lower rotation shaft, and the upper rotation member piece may rotate forward about the connection shaft in stowing the seat body; so that the seat cushion shifts to the stowed position. When the seat cushion reaches the stowed position, the upper support member may abut against the lower support member.

In the aforementioned configuration, the support member that supports the rotation member piece also serves as a stopper that regulates the rotation amount of the rotation member piece. Accordingly, it is possible to reduce the number of components compared to the configuration in which the member supporting the rotation member piece is provided separately from the member regulating the rotation amount of the rotation member piece.

Further, in the aforementioned configuration, a concavo-convex pattern may be formed in at least an abutting surface provided in the upper support member against the lower support member or an abutting surface provided in the lower support member against the upper support member.

In the aforementioned configuration, since the rigidity of the support member having the concavo-convex pattern formed on the abutting surface can be improved, it is possible to suppress a deformation or the like of the support member due to an impact which is generated when the support members abut against each other.

Further, in the aforementioned configuration, in the upper rotation member pieces provided in each of the plurality of rotation members, one of the upper rotation member pieces that is positioned closest to one end portion in the width direction may be positioned closer to one end portion in the width direction than any one of the lower rotation member pieces provided in each of the plurality of rotation members. In the upper rotation member pieces provided in each of the plurality of rotation members, one of the upper rotation member pieces that is positioned closest to the other end portion in the width direction may be positioned closer to the other end portion in the width direction than any one of the lower rotation member pieces provided in each of the plurality of rotation members.

In the aforementioned configuration, the plurality of upper rotation member piece support the seat cushion frame through the upper support member. In such a configuration, when the upper rotation member piece which is positioned the closest to the end portion in the width direction of the vehicle seat is positioned outside the lower rotation member piece, the gap between the support position positioned the closest to one end portion in the width direction and the support position positioned the closest to the other end portion in the position where the seat cushion frame is supported becomes larger. As a result, it is possible to further stably support the seat cushion including the seat cushion frame.

Further, in the aforementioned configuration, an end surface of the lower support member provided closer to one end portion in the width direction may be positioned closer to one end portion in the width direction than any one of the lower rotation member pieces provided in each of the plurality of rotation members. An end surface of the lower support member provided closer to the other end portion in the width direction may be positioned closer to the other end portion in the width direction than any one of the lower rotation member pieces provided in each of the plurality of rotation members.

In the aforementioned configuration, when the portion positioned the closest to the end portion in the width direction of the vehicle seat in the lower support member is positioned outside any one of the lower rotation member pieces, the lower support member in the width direction of the vehicle seat becomes somewhat wide. Accordingly, it is possible to further stably support the lower rotation member piece and the seat cushion positioned above the lower rotation member piece and indirectly supported by the lower rotation member piece.

Further, in the aforementioned configuration, a pair of the rotation members may be attached to the center portion of the seat cushion in the width direction while being separated from each other in the width direction. The connection shaft may extend from a connection portion between the upper rotation member piece and the lower rotation member piece of one rotation member in the pair of rotation members to a connection portion between the upper rotation member piece and the lower rotation member piece of the other rotation member. The vehicle seat may further include a spiral spring that biases both the upper rotation member piece and the lower rotation member piece to return both the upper rotation member piece and the lower rotation member piece to their original positions before the seat body is stowed. The spiral spring may be disposed while being coiled around the connection shaft.

In the aforementioned configuration, since the spiral spring is disposed with an effective use of the space around the connection shaft, it is possible to further efficiently suppress the size increase of the vehicle seat.

Further, in the aforementioned configuration, the lower rotation member piece and the upper rotation member piece intersecting with both end portions of the connection member in the width direction may be attached to the both end portions. The spiral spring may be positioned between the both end portions of the connection member in the width direction and be interposed between the lower rotation member pieces and between the upper rotation member pieces.

In the aforementioned configuration, since the spiral spring is disposed with an effective use of the space between the connection member pieces, it is possible to further efficiently suppress the size increase of the vehicle seat.

Further, in the aforementioned configuration, the vehicle seat may further include: a plurality of seat fixing members that are provided at the lower position of the seat cushion to fix the seat body while being separated from each other in the width direction, and a seat side connection member that connects the seat fixing members to each other in the width direction. The lower support member may be fixed to the seat side connection member.

In the aforementioned configuration, since the lower support member is fixed to the seat side connection member taking advantage of the seat side connection member with a relatively high rigidity that connects the seat fixing members to each other, the attachment rigidity to the lower support member can be improved.

DETAILED DESCRIPTION

Hereinafter, a vehicle seat according to an embodiment of the present invention (hereinafter, also referred to as "this embodiment") will be described with reference to the drawings.

In the description below, the front-back direction of the vehicle seat and the seat body is the front-back direction of the vehicle, and corresponds to the traveling direction of the vehicle. Further, the width direction of the vehicle seat and the seat body is the width direction of the vehicle (hereinafter, also referred to as the "vehicle width direction"), and corresponds to the transverse direction to the vehicle front. Hereinafter, the locations or the positions of the respective members when the vehicle seat is in the upright state will be described, unless otherwise stated.

Figure 1:
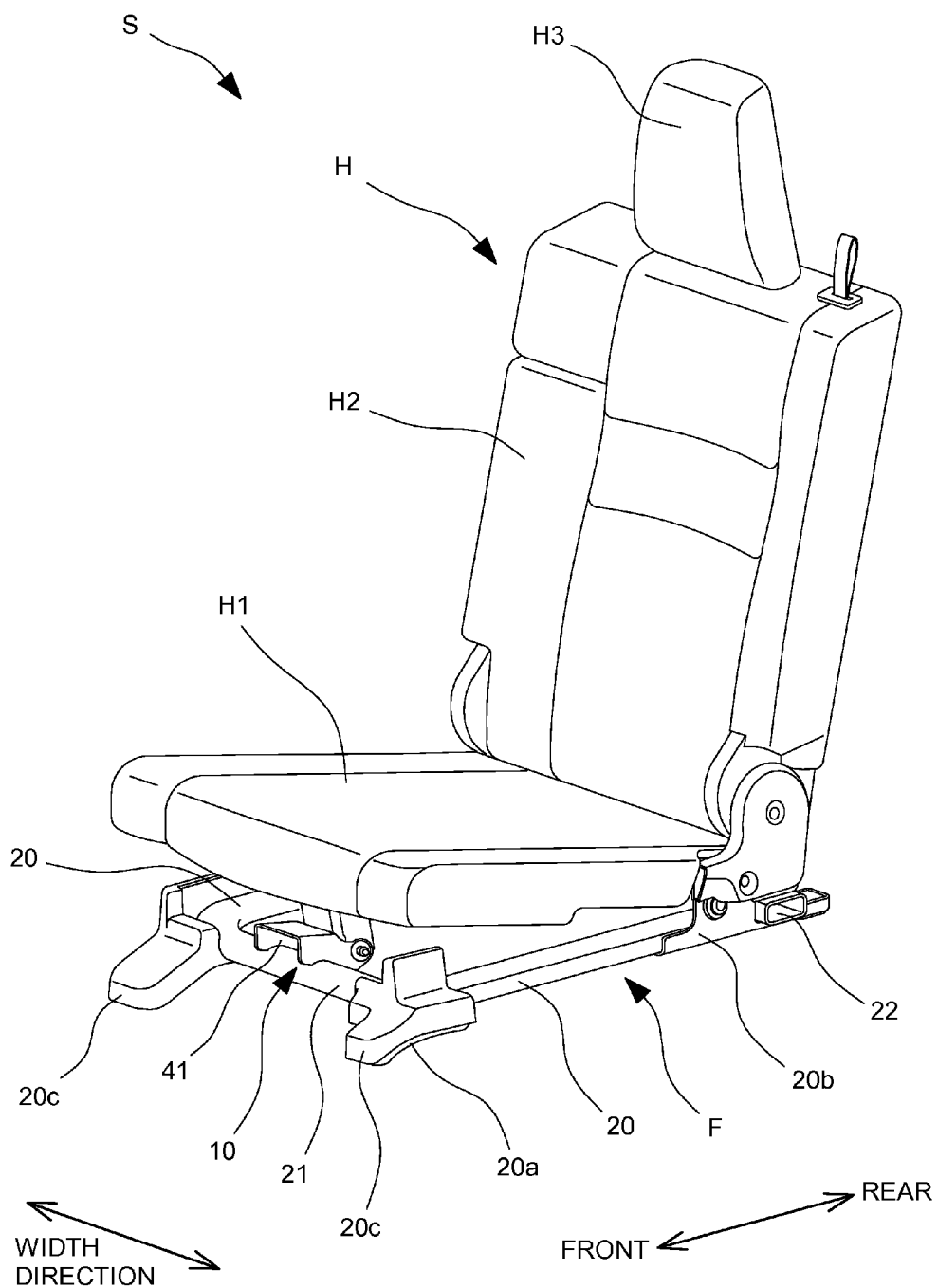
FIG. 1 is a perspective view diagram illustrating an appearance of a vehicle seat according to an embodiment of the present invention.

A vehicle seat (hereinafter, simply referred to as the "seat") S according to an embodiment of the present invention is mounted as, for example, a rear seat of the vehicle, and includes a seat body H and a foot mechanism F as illustrated in FIG. 1. The seat body H includes a seat cushion H1 on which a passenger sits, a seat back H2 which supports the passenger from the back side, and a head rest H3 which supports a head portion of the passenger, as components. The structures of the seat cushion H1, the seat back H2, and the head rest H3 are commonly known, respectively. For example, the seat cushion H1 is formed by placing a cushion (not illustrated) on a seat cushion frame 1 having a substantially rectangular shape illustrated in FIGS. 4 and 5.

Figure 4:
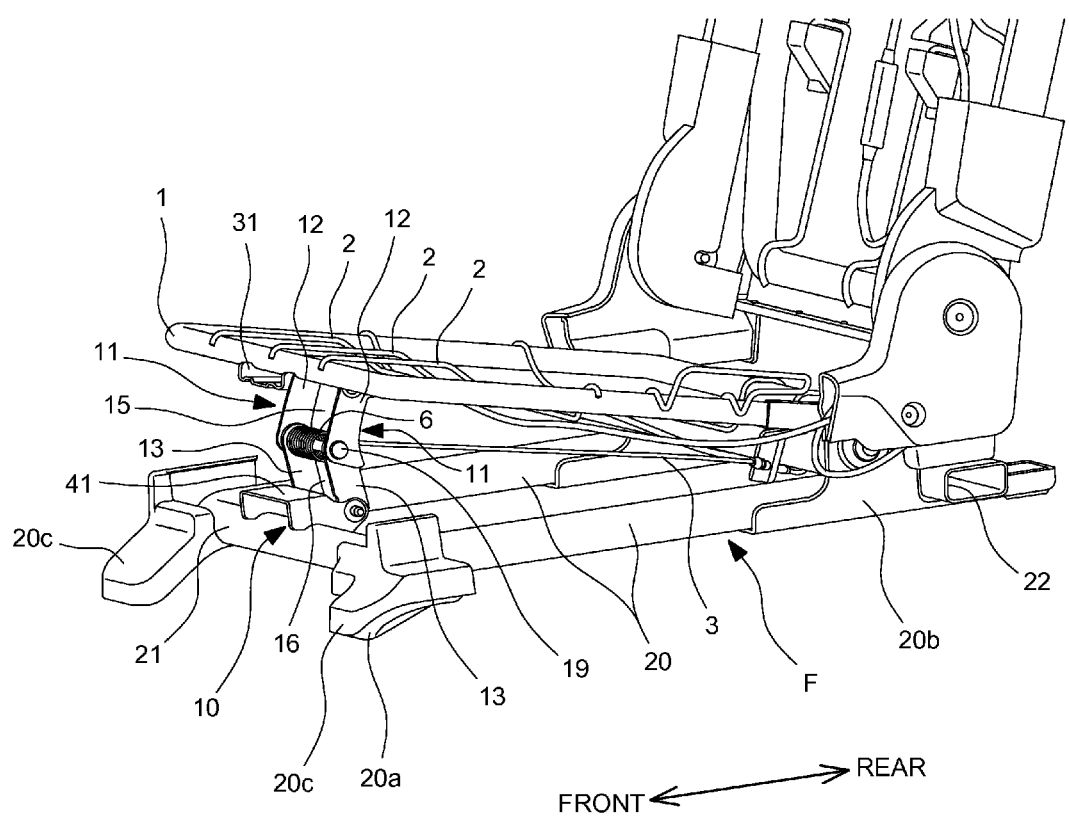
FIG. 4 is a perspective view diagram illustrating a structure of a seat frame according to the embodiment of the present invention.
Figure 5:
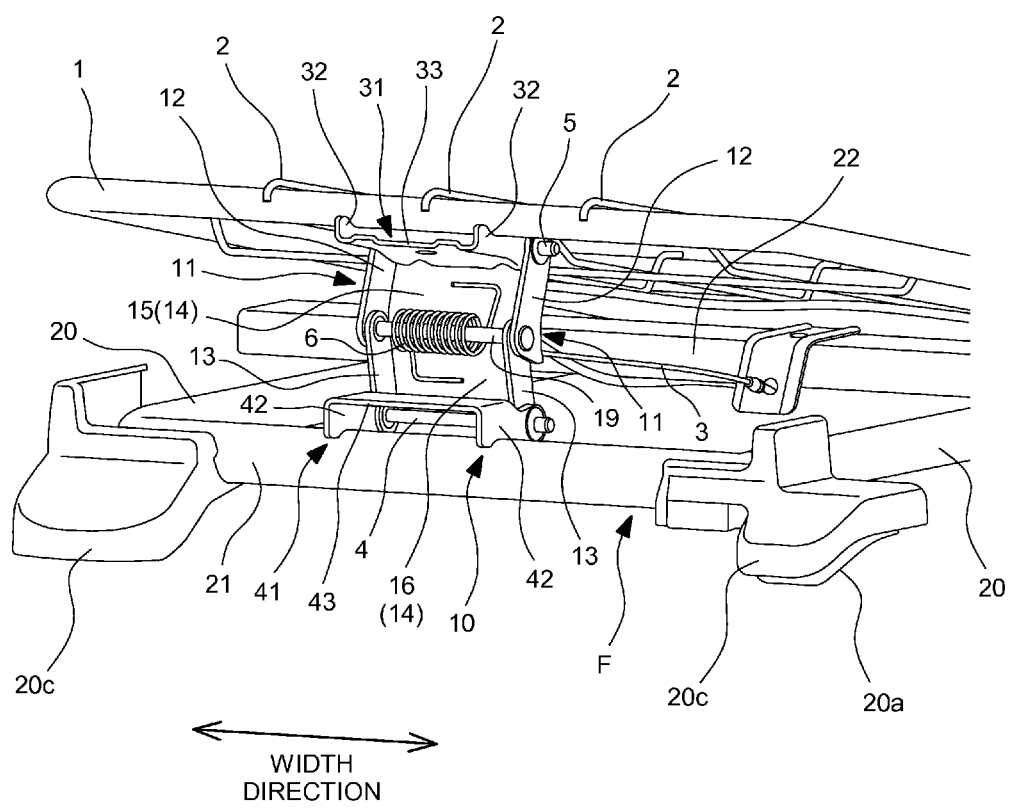
FIG. 5 is a perspective view diagram illustrating a foot link unit according to the embodiment of the present invention.

Furthermore, in the seat cushion frame 1, a gap is formed between the front and rear end portions of the seat S in the front-back direction. Frame side connectors 2 illustrated in FIGS. 4 and 5 are disposed in the gap. The frame side connectors 2 are provided to connect the front and rear end portions of the seat cushion frame 1, each of which is formed by a wire in this embodiment, to extend in the front-back direction. Further, the front end portions of the frame side connectors 2 are welded to the front end portion of the seat cushion frame 1, and the rear end portions of the frame side connectors 2 are welded to the rear end portion of the seat cushion frame 1. Furthermore, the frame side connectors 2 are arranged at certain intervals therebetween in the width direction of the seat S, and in particular, three frame side connectors are arranged in this embodiment.

In this embodiment, the seat body H is formed to be stowable. The seat body H is upright as illustrated in FIG. 2 when the seat is in use, and is folded as illustrated in FIG. 3 when the seat is not in use.

More specifically, when the seat S is in the upright state, the seat body H is also in the upright state. In such a state, the seat cushion H1 and the seat back H2 form a substantially L-shape when seen from the vehicle width direction, and the head rest H3 is in the upright state on the upper portion of the seat back H2. In this case, the seat cushion H1 is in the use position, and when the seat cushion is in the use position as illustrated in FIG. 2, the front end portion of the seat cushion H1 is at a rather higher position than the rear end portion thereof.

When the seat S is in the stowed state, the seat body H is also in the stowed state. In such a state, the seat back H2 is tilted forward and is folded on the seat cushion H1, and the head rest H3 is positioned in front of the seat cushion H1 and in a state where it is tilted somewhat lower than the seat back H2 folded on the seat cushion H1. In this case, the seat cushion H1 is in the stowed position, and in a state where the seat cushion H1 is in the stowed position as illustrated in FIG. 3, the front and rear end portions of the seat cushion H1 are positioned at the substantially same height to each other. Further, the seat cushion H1 in the stowed position is somewhat closer to a vehicle body floor than in its use position.

Figure 2:
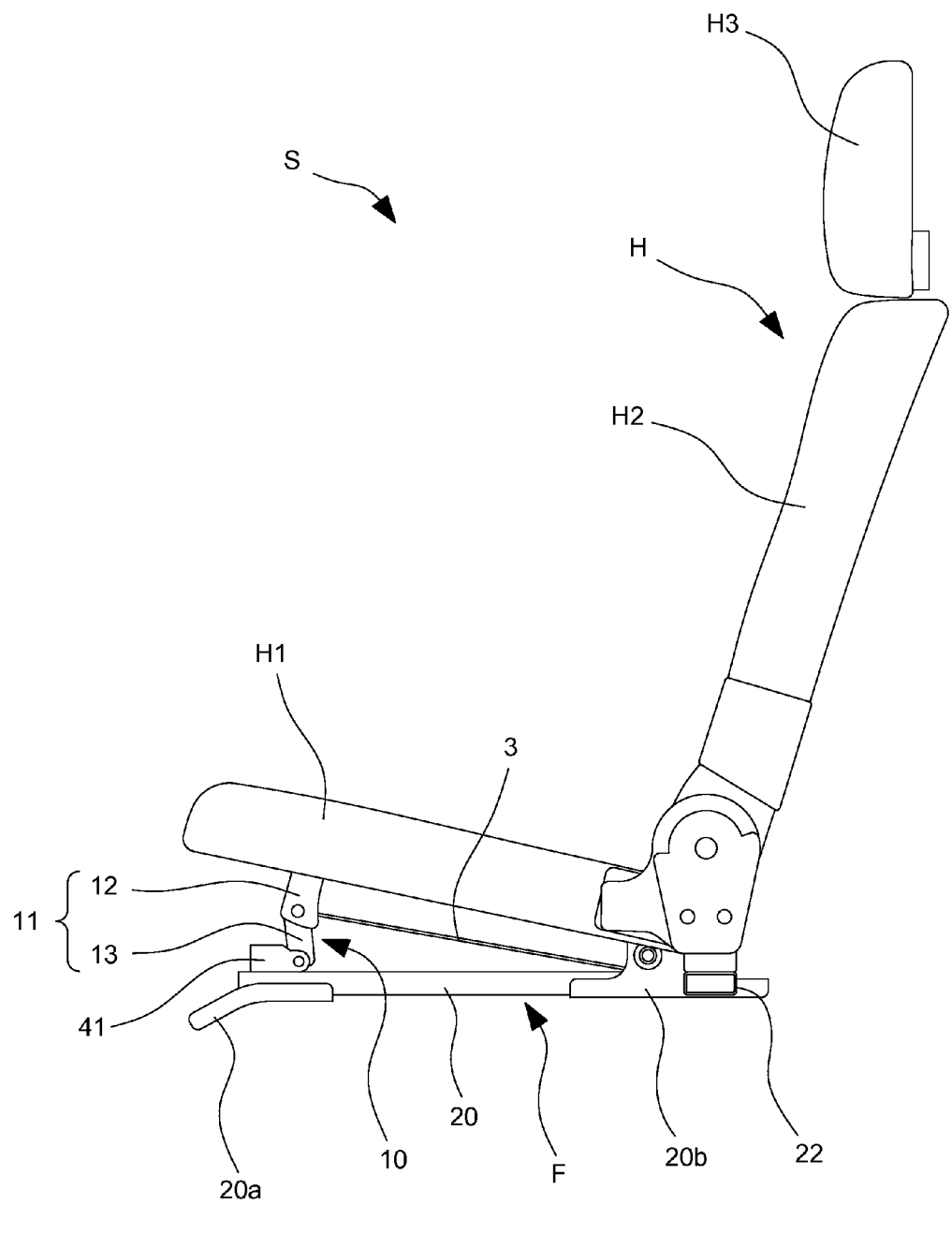
FIG. 2 is a side view diagram illustrating the vehicle seat according to the embodiment of the present invention in an upright state.
Figure 3:
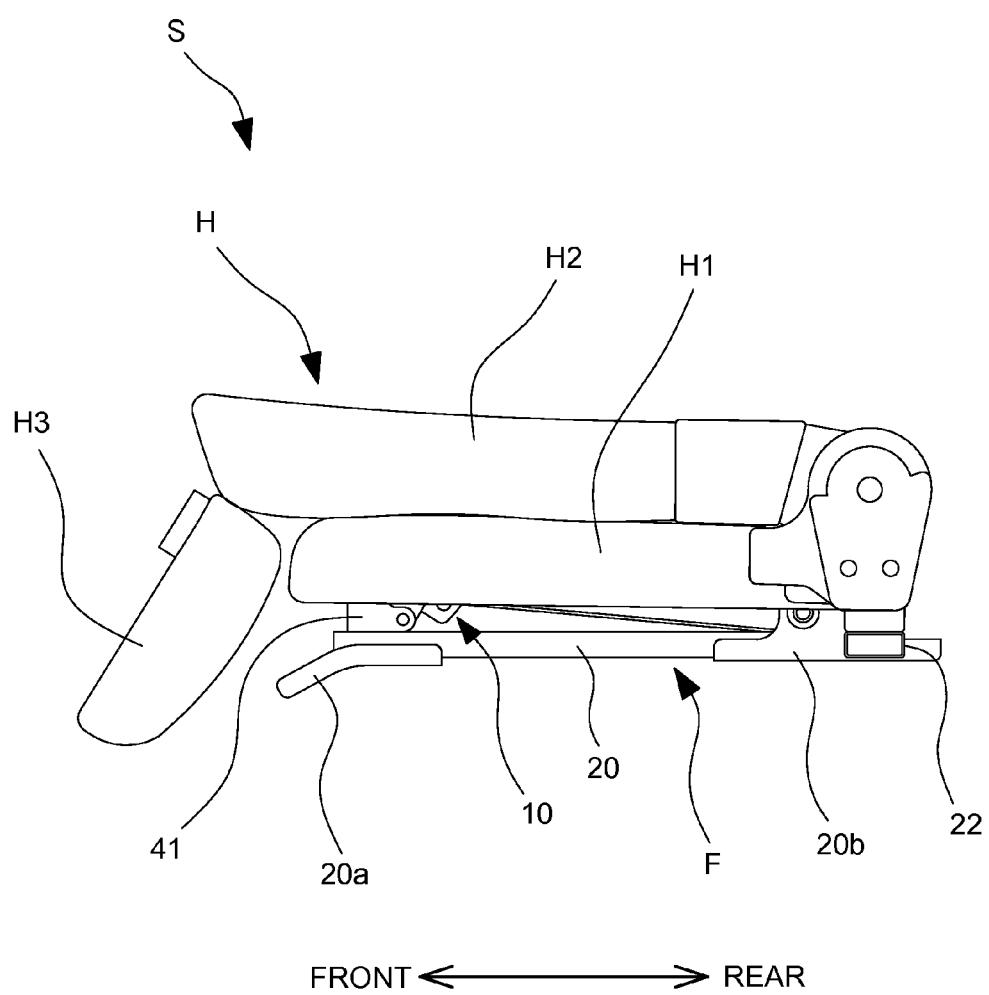
FIG. 3 is a side view diagram illustrating a state where the vehicle seat according to the embodiment of the present invention is stowed.

As described above, for stowing the seat body H, the respective portions of the seat body H, that is, the seat cushion H1, the seat back H2, and the head rest H3 are operated so that the state is shifted from the state illustrated in FIG. 2 to the state illustrated in FIG. 3. To start the stowage of the seat body H, the passenger operates an operating unit (not illustrated) which is provided in the seat body H.

When the passenger operates the operating unit, the seat back H2 is tilted forward by the operating force, and hence the head rest H3 is tilted forward. When a driving force which is generated by the tilting forward of the seat back H2 is transmitted to a foot link unit 10 (described below), the foot link unit 10 is operated along with the seat cushion H1. Accordingly, the seat cushion H1 shifts from the use position toward the stowed position. The shift operation of the seat cushion H1 is described below in detail.

The foot mechanism F is provided to fix the seat body H to the vehicle body floor, and is disposed below the seat cushion H1. More specifically, the foot mechanism F includes: a pair of foot bars 20 which extend in the front-back direction, a front connection bar 21 which connects the front end portions of the foot bars 20 to each other, a rear connection bar 22 which connects the rear end portions of the foot bars 20 to each other, and the foot link unit 10, as illustrated in FIGS. 1 and 4. The foot bars 20 correspond to seat fixing members, and the front connection bar 21 corresponds to a seat side connection member.

The pair of foot bars 20 are separated from each other while being parallel to each other in the vehicle width direction, in which one of the foot bars 20 is disposed below one end portion of the seat cushion frame 1 in the width direction of the seat S and the other foot bar 20 is disposed below the other end portion of the seat cushion frame 1. Further, each of the front end portions of the foot bars 20 is provided with a tongue-like foot fixing portion 20*a*, the foot fixing portions 20*a* are fixed to the vehicle body floor by a fastening member such as a bolt, and thereby the foot bars 20 are fixed to the vehicle body. Furthermore, in this embodiment, a foot cover 20*c* which covers each foot fixing portion 20*a* from above is attached to the foot fixing portion 20*a*.

Further, the rear end portion of each foot bar 20 is provided with an attachment bracket 20*b* which is used to attach the seat cushion H1 to the foot bar 20. The attachment bracket 20*b* supports a rotation shaft (not illustrated), and rotatably supports the rear end portion of the seat cushion frame 1 through the rotation shaft. In this way, when the seat cushion frame 1 is supported by the attachment bracket 20*b*, the seat cushion H1 is attached to the foot bar 20.

The front connection bar 21 is a cylindrical body which connects the foot bars 20 to each other in the width direction of the seat S, and the end portion thereof is welded to the front end area of each foot bar 20. Similarly, the rear connection bar 22 is a cylindrical body which connects the foot bars 20 to each other in the width direction of the seat S, and the end portion thereof is welded to the rear end area of the upper surface of each foot bar 20. Further, the foot link unit 10 is disposed at the center portion of the front connection bar 21. The foot link unit 10 is operated when the driving force is transmitted from the seat back H2 in stowing the seat body H, to lead the seat cushion H1 from the use position to the stowed position.

Specifically, the foot link unit 10 is interposed between the front connection bar 21 and the front end portion of the seat cushion frame 1 in the vertical direction to connect the front connection bar 21 to the front end portion of the seat cushion frame 1 as illustrated in FIGS. 1 to 4. One end portion of a driving force transmitting cable 3 is connected to the foot link unit 10. In the driving force transmitting cable 3, the end portion at the opposite side to the side connected to the foot link unit 10 is connected to the seat back H2.

Furthermore, when the seat back H2 is tilted forward in the operation of stowing the seat S, the end portion of the driving force transmitting cable 3 which is connected to the foot link unit 10 is pulled toward the seat back H2, that is, rearward. Accordingly, the foot link unit 10 moves to pull the front end portion of the seat cushion frame 1 downward and rearward. Along with this movement, the rear end portion of the seat cushion frame 1 rotates rearward. As a result, the seat cushion H1 is positioned in the stowed position.

Hereinafter, a configuration example of the foot link unit 10 will be described in detail.

The foot link unit 10 includes a pair of link members 11 as a rotation member as illustrated in FIGS. 4 and 5. The pair of link members 11 is separated from each other in the width direction of the seat S, and the upper end portions thereof are attached to the seat cushion H1, and more precisely, to the front end portion of the seat cushion frame 1. The number of the link members 11 is not limited to two, and may be one or more. For example, three or more link members 11 may be arranged at certain intervals therebetween in the width direction of the seat S.

The respective link members 11 rotate about the rotation shaft along the width direction of the seat S to shift the seat cushion H1 to the stowed position in stowing the seat body H, that is, in stowing the seat S.

More specifically, each link member 11 is divided into two pieces in the vertical direction, and an upper end portion of an upper link member piece 12 positioned at the upper side is attached to the front end portion of the seat cushion frame 1 through an upper support member 31 to be described later. A lower end portion of a lower link member piece 13 positioned at the lower side is attached to the front connection bar 21 through a lower support member 41 to be described later. Here, the upper link member piece 12 corresponds to the upper rotation member piece, and the lower link member piece 13 corresponds to the lower rotation member piece. Further, each of the link member pieces 12, 13 is formed as thick flat plates which are made from a resin material or metal.

Further, the lower end portion of the upper link member piece 12 and the upper end portion of the lower link member piece 13 are connected to each other in a manner that the link member pieces 12, 13 are rotatable relative to each other. In this case, the rotation shaft at the time when one of the upper link member piece 12 and the lower link member piece 13 rotates relative to the other thereof follows the width direction of the seat S, and specifically, a connection shaft 19 to be described later.

Figure 6:
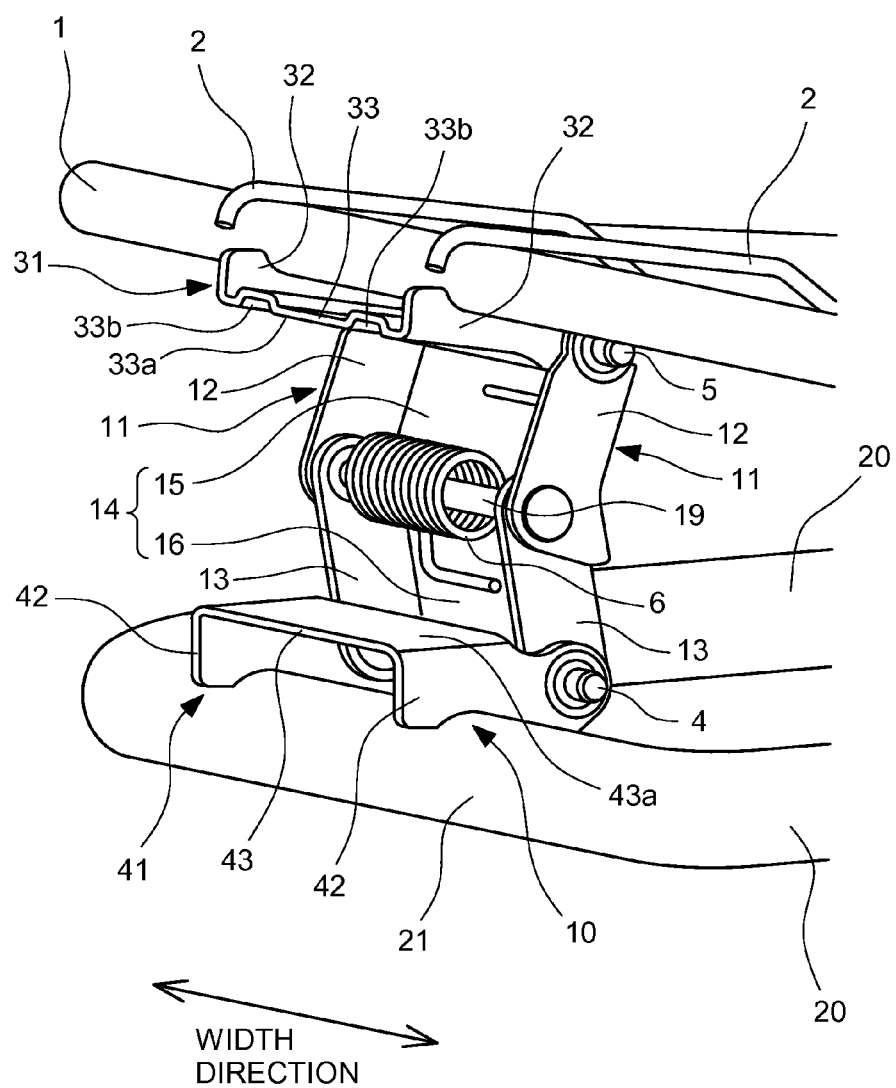
FIG. 6 is a perspective view diagram illustrating the foot link unit when the vehicle seat is in the upright state.

The link member 11 with the aforementioned configuration extends as illustrated in FIG. 6 when the seat S is in the upright state. At this time, the center portion of the link member 11, that is, the connection portion between the upper link member piece 12 and the lower link member piece 13 is disposed somewhat ahead of the upper end portion or the lower end portion of the link member 11.

Figure 7:
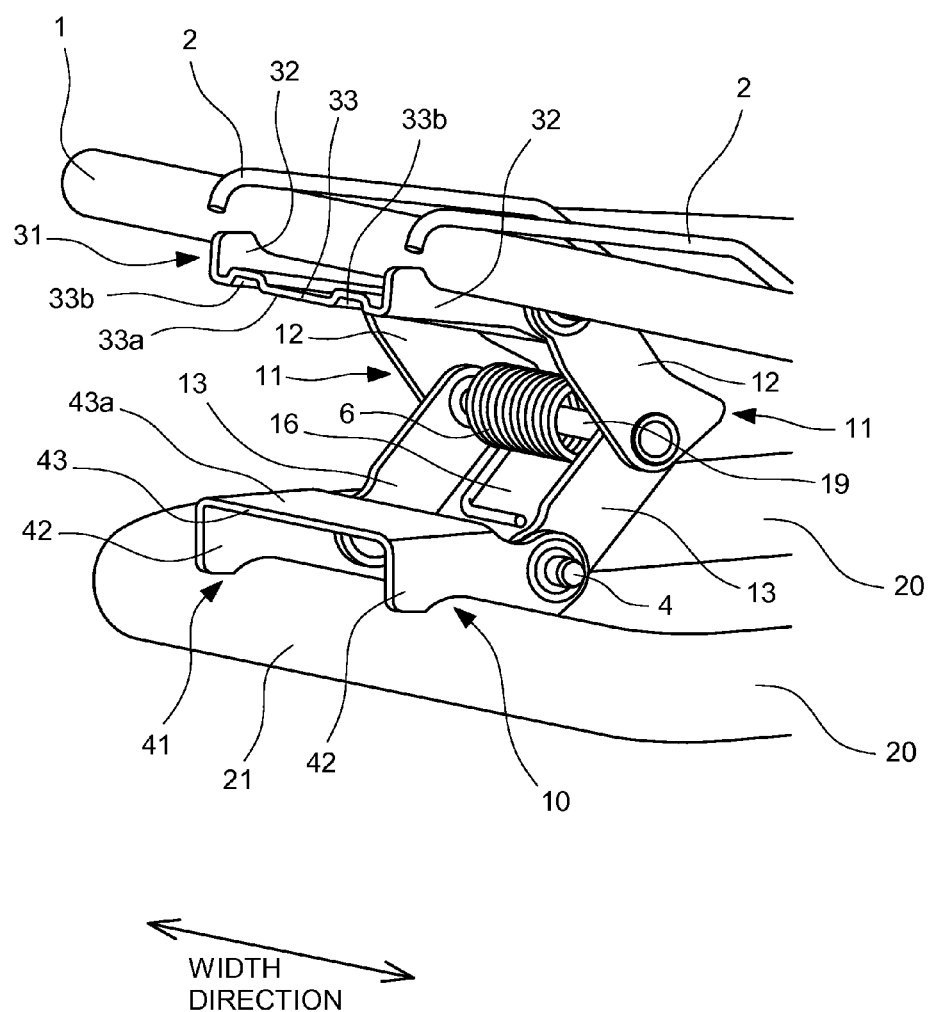
FIG. 7 is a perspective view diagram illustrating a state of the foot link unit when the vehicle seat is on the way to stowage.

When the stowage of the seat S is started as illustrated in FIG. 7, the center portion of the link member 11, that is, the connection portion between the upper link member piece 12 and the lower link member piece 13 is pulled rearward, and hence the link member 11 is transversely folded in a V-shape. This is because one end portion of the driving force transmitting cable 3 is connected to the center portion of the link member 11, and the end portion of the driving force transmitting cable 3 that is connected to the link member 11 is pulled rearward along with the operation of the tilting forward the seat back H2 in stowing the seat S. Then, each of the link member pieces 12, 13 rotates about the rotation shaft along the width direction of the seat S to be pulled by the driving force transmitting cable 3.

Specifically, the lower end portion of the lower link member piece 13 is rotatably supported by the lower rotation shaft 4. The lower rotation shaft 4 corresponds to the rotation shaft, and is disposed in a manner that the axial direction follows the width direction of the seat S. One end portion of the driving force transmitting cable 3 is connected to the upper end portion of the lower link member piece 13 as described above.

As illustrated in FIG. 6, the upper end portion of the upper link member piece 12 is rotatably supported by the upper rotation shaft 5. The upper rotation shaft 5 is disposed in a manner that the axial direction follows the width direction of the seat S and is disposed to follow the connection shaft 19 to be described later. One end portion of the driving force transmitting cable 3 is connected to the lower end portion of the upper link member piece 12 as described above. Further, the lower end portion of the upper link member piece 12 is rotatably supported by the connection shaft 19. The connection shaft 19 is a shaft body which connects the upper link member piece 12 to the lower link member piece 13, and the axial direction thereof follows the width direction of the seat S.

Now, the connection shaft 19 is described in detail. The connection shaft 19 is positioned between the pair of link members 11 as illustrated in FIG. 5. Further, each of the center portions of the link members 11, that is, each of the connection portions between the upper link member pieces 12 and the lower link member pieces 13 are rotatably supported by each of both end portions of the connection shaft 19 in the axial direction. In other words, the connection shaft 19 extends from the connection portion between the upper link member piece 12 and the lower link member piece 13 of one link member 11 of the pair of link members 11 to the connection portion between the upper link member piece 12 and the lower link member piece 13 of the other link member 11. Further, the axial end portions of the connection shaft 19 are swaged to form a stopper.

When the end portion of the driving force transmitting cable 3 which is connected to the link member 11 is pulled rearward along with the operation of tilting the seat back H2 in stowing the seat S, the upper end portion of the lower link member piece 13 is pulled rearward by the driving force transmitting cable 3, so that the lower link member piece 13 rotates to tilt rearward. Further, since the lower end portion of the upper link member piece 12 is pulled rearward by the driving force transmitting cable 3, the upper link member piece 12 rotates relative to the lower link member piece 13 in a direction in which the upper link member 12 tilts forward. Specifically, the upper link member piece 12 rotates to intersect the lower link member piece 13 in a manner similar to scissors-blades. At this time, the upper link member piece 12 rotates about the upper rotation shaft 5. Accordingly, the seat cushion H1 which is attached to the upper end portion of the upper link member piece 12 is operated to relatively rotate with respect to the upper link member piece 12.

Figure 8:
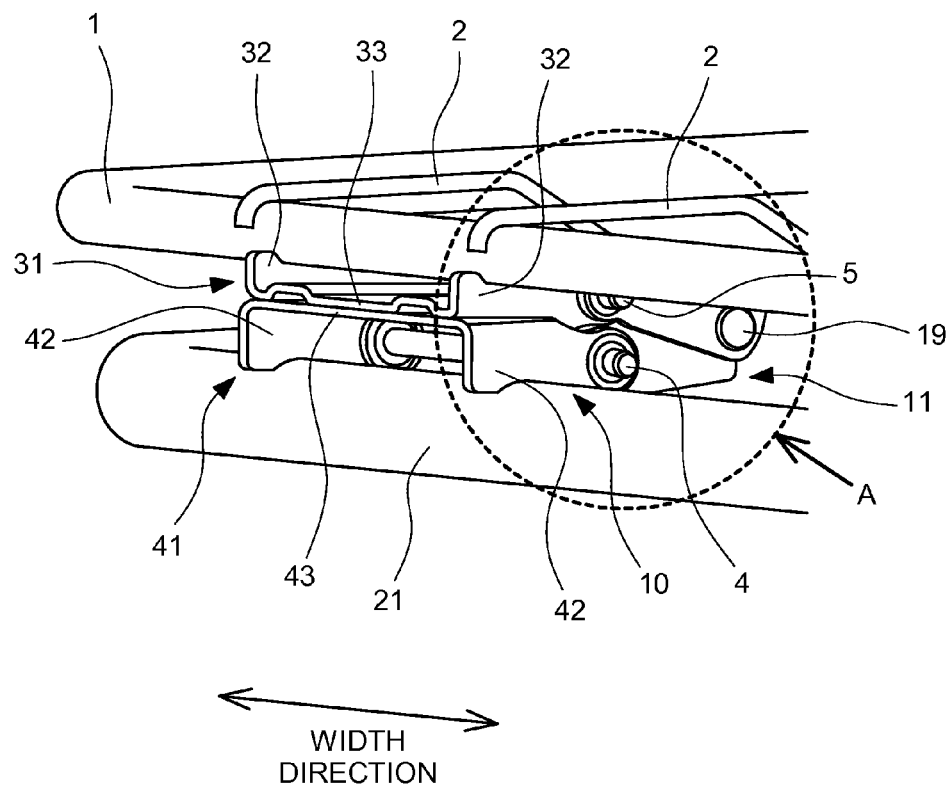
FIG. 8 is a perspective view diagram illustrating a state of the foot link unit when the vehicle seat is in a stowed state.

Each portion of the link member 11, that is, the upper link member piece 12 and the lower link member piece 13 are operated as described above, so that the link member 11 is completely folded as illustrated in FIG. 8. That is, at the time when the folding operation of each of the link members 11 to stow the seat body H is completed, the upper link member piece 12 and the lower link member piece 13 are positioned at the substantially same position to each other in the vertical direction and extend along the front-back direction of the vehicle. In such a state, the seat cushion H1 reaches the stowed position.

As described above, the upper end portion of each of the pair of link members 11, more specifically, each of the upper link member pieces 12 is attached to the front end portion of the seat cushion frame 1 through the upper support member 31 to be described later. In particular, in this embodiment, each of the upper link member pieces 12 is attached to the center portion in the width direction of the seat S in the front end portion of the seat cushion frame 1. In such a positional relation, each of the link members 11 can be stowed within a range where the seat cushion H1 is disposed in the width direction of the seat S. That is, each of the link members 11 is disposed to not protrude outside relative to both end portions of the seat cushion H1 in the width direction. Thus, according to the configuration of this embodiment, it is possible to suppress the size increase of the seat S, and in particular, the size increase of the seat S in the width direction though the link members 11 are provided.

As illustrated in FIGS. 5 to 7, in each of the link members 11, the upper link member piece 12 is positioned outside relative to the lower link member piece 13 in the width direction of the seat S. In other words, in the upper link member pieces 12 provided in each of the pair of link members 11, the upper link member piece 12 which is positioned the closest to one end portion in the width direction of the seat S is positioned closer to one end in the width direction of the seat S than any one of the lower link member pieces 13 provided in each of the pair of link members 11. Similarly, the upper link member piece 12 which is positioned the closest to the other end portion in the width direction of the seat S is positioned closer to the other end portion in the width direction of the seat S than any one of the lower link member pieces 13 provided in each of the pair of link members 11. In such a positional relation, it is possible to further stably support the seat cushion H1 including the seat cushion frame 1.

More specifically, the upper link member pieces 12 of each of the link members 11 support the seat cushion H1, particularly the front end portion of the seat cushion frame 1 through the upper support member 31 that are described below. In such a configuration, when the upper link member piece 12 and the lower link member piece 13 are located as described above, the gap between the position the closest to one end portion in the width direction of the seat S and the position the closest to the other end portion becomes larger, in the position where the upper link member pieces 12 support the seat cushion frame 1. As a result, the seat cushion H1 including the seat cushion frame 1 is stably supported by each of the upper link member pieces 12.

Further, in this embodiment, the position where the upper link member pieces 12 support the seat cushion frame 1 is displaced from the position where the frame side connectors 2 are arranged, in the width direction of the seat S. Specifically, the position is present between the arrangement positions of the frame side connectors 2. In such a positional relation, the interference between the upper link member piece 12 and the frame side connector 2 is suppressed.

Further, in this embodiment, a connection member 14 is provided between the pair of link members 11 as illustrated in FIG. 6. The connection member 14 extends in the width direction of the seat S to connect the pair of link members 11 to each other. More specifically, the connection member 14 according to this embodiment is divided into two members, that is, formed by an upper connection member 15 which connects the upper link member pieces 12 to each other and a lower connection member 16 which connects the lower link member pieces 13 to each other.

The upper connection member 15 is formed in a substantially flat plate shape, and the upper link member pieces 12 are disposed at both end positions of the upper connection member 15 in the width direction of the seat S to be perpendicular to the upper connection member 15. Furthermore, in this embodiment, the pair of upper link member pieces 12 and the upper connection member 15 are integrally molded to form a substantially U-shape. Similarly, the lower connection member 16 is formed in a substantially flat plate shape, and the lower link member pieces 13 are disposed in both end positions of the lower connection member 16 in the width direction of the seat S to be perpendicular to the lower connection member 16. Further, in this embodiment, the pair of lower link member pieces 13 and the lower connection member 16 are integrally molded to form a substantially U-shape. As a result of the aforementioned structure, in this embodiment, the rigidity of each of the link member pieces 12, 13 is ensured.

Further, in this embodiment, the connection member 14, specifically, the upper connection member 15 and the lower connection member 16 constituting the connection member 14, is disposed to stride the position where the frame side connector 2 is disposed in the width direction of the seat S, as illustrated in FIGS. 4 and 5. In this case, in the seat cushion frame 1, the rigidity of the position where the frame side connector 2 is disposed is higher than that of the other portion. In this embodiment, since the connection member 14 is disposed to stride the position where the frame side connector 2 is disposed, the attachment rigidity of the connection member 14 to the link member 11 attached to the connection member 14 can be improved.

As illustrated in FIGS. 4 and 5, the foot link unit 10 includes the upper support member 31, the lower support member 41, and a spiral spring 6 as its components, in addition to the link member 11 and the connection member 14 described above. The upper support member 31 supports the upper link member pieces 12 of each of the link members 11, and is fixed to the lower end surface of the front end portion of the seat cushion frame 1. In this embodiment, the upper support member 31 rotatably supports each of the upper link member pieces 12 through the upper rotation shaft 5.

Now, the structure of the upper support member 31 is described. As illustrated in FIG. 5, the upper support member 31 includes a pair of link support portions 32 which are disposed with a gap therebetween in the width direction of the seat S, and a facing portion 33 which is disposed between the link support portions 32 and faces the lower support member 41. Each of the pair of link support portions 32 is welded and fixed to the lower end surface of the front end portion of the seat cushion frame 1, and extends toward the rear end portion of the seat cushion frame 1. Further, the upper rotation shaft 5 is attached to the rear end portion of the link support portion 32, and the upper end portion of the upper link member piece 12 is rotatably supported by the upper rotation shaft 5. That is, the upper link member piece 12 is rotatably supported by the rear end portion of the link support portion 32 through the upper rotation shaft 5.

In this embodiment, the upper link member piece 12 is disposed outside the link support portion 32 in the width direction of the seat S. That is, in the upper link member pieces 12 provided in each of the pair of link members 11, the upper link member piece 12 which is positioned the closest to one end portion in the width direction of the seat S is positioned closer to one end portion in the width direction than the link support portion 32 which is positioned near one end portion in the width direction of the seat S in the pair of link support portions 32. Similarly, the upper link member piece 12 which is disposed closer to the other end portion in the width direction of the seat S is positioned closer to the other end in the width direction than the link support portion 32 which is positioned near the other end in the width direction of the seat S. In such a positional relation, since the gap between the positions where the upper link member pieces 12 support the seat cushion frame 1 becomes wider, it is possible to further stably support the seat cushion H1.

The facing portion 33 has a substantially rectangular plate shape, is disposed at the lower position of the front end portion of the seat cushion frame 1, and is widened in the width direction of the seat S to connect the link support portions 32 to each other. A lower surface 33a of the facing portion 33 is a facing surface which faces the lower support member 41, which corresponds to an abutting surface which abuts against the lower support member 41 when each of the link members 11 is completely folded in stowing the seat S.

Further, a concavo-convex pattern is formed in the lower surface 33a of the facing portion 33 as illustrated in FIGS. 5 and 6. More specifically, as illustrated in FIG. 6, recesses 33b are formed rather inside both end portions of the lower surface 33a in the width direction of the seat S to be depressed toward the seat cushion frame 1. In this way, since the concavo-convex pattern is formed in the lower surface 33a of the facing portion 33 which abuts against the lower support member 41, the rigidity of the upper support member 31 can be improved. As a result, it is possible to suppress deformation or the like of the upper support member 31 by the impact which is generated when the support members 31, 41 abut against each other.

The lower support member 41 supports the lower link member pieces 13 of each of the link members 11, and in this embodiment, rotatably supports each of the lower link member pieces 13 through the lower rotation shaft 4. The lower support member 41 is fixed to the upper end surface of the center portion of the front connection bar 21. In this way, in this embodiment, the lower support member 41 is fixed to the front connection bar 21, taking advantage of the front connection bar 21 having a relatively high rigidity to connect the foot bars 20 to each other. Accordingly, the attachment rigidity to the lower support member 41 can be improved.

The structure of the lower support member 41 will be described. As illustrated in FIGS. 5 to 8, the lower support member 41 includes a pair of link support portions 42 which are disposed with a gap therebetween in the width direction of the seat S and a facing portion 43 which is positioned between the link support portions 42 and faces the upper support member 31. Each of the pair of link support portions 42 is welded and fixed to the upper end surface of the center portion of the front connection bar 21, and extends rearward. Then, the lower rotation shaft 4 is attached to the rear end portion of the link support portion 42, and the lower end portion of the lower link member piece 13 is rotatably supported by the lower rotation shaft 4. That is, the lower link member piece 13 is rotatably supported by the rear end portion of the link support portion 42 through the lower rotation shaft 4.

In this embodiment, the lower link member piece 13 is disposed inside the link support portion 42 in the width direction of the seat S. That is, in the lower support member 41, the end surface (the inner end surface) of the link support portion 42 which is disposed near one end in the width direction of the seat S is positioned closer to one end in the width direction of the seat S than any one of the lower link member pieces 13 provided in each of the plurality of link members 11. Further, in the lower support member 41, the end surface (the inner end surface) of the link support portion 42 which is disposed near the other end in the width direction of the seat S is positioned closer to the other end in the width direction of the seat S than any one of the lower link member pieces 13 provided in each of the plurality of link members 11. In such a positional relation, the lower support member 41 has a rather wide structure in the width direction of the seat S. Accordingly, it is possible to further stably support the lower link member pieces 13 and the seat cushion H1 which is positioned above the lower link member pieces 13 and is indirectly supported by the lower link member pieces 13.

The facing portion 43 has a substantially rectangular plate shape, is disposed at the upper position of the center portion of the front connection bar 21, and spread in the width direction of the seat S to connect the link support portions 42 to each other. An upper surface 43a of the facing portion 43 is a facing surface which faces the upper support member 31, and corresponds to an abutting surface which abuts against the upper support member 31 when the respective link members 11 are completely folded in stowing the seat S. Furthermore, in this embodiment, the upper surface 43a of the facing portion 43 is formed as a plane surface without a concavo-convex pattern, different from the lower surface 33a of the facing portion 33 of the upper support member 31.

However, the concavo-convex pattern which is formed in the facing surfaces of the support members 31, 41 facing each other may be formed in at least any one of the lower surface 33a of the facing portion 33 of the upper support member 31 and the upper surface 43a of the facing portion 43 of the lower support member 41. For example, the concavo-convex pattern may be formed in the upper surface 43a of the facing portion 43 of the lower support member 41. In this case, one of the support members 31, 41 (in this embodiment, the upper support member 31) which has the link support portion 32, 42 outside the link member pieces 12, 13 in the width direction of the seat S is wider than the other of the support members 31, 41. For this reason, it is easy to form a concavo-convex pattern, and it is desirable for the concavo-convex pattern to be formed in the abutting surface of the support member.

The upper support member 31 and the lower support member 41 abut against each other as illustrated in FIG. 8 when the link member 11 is completely folded in stowing the seat S as described above. The case where the link member 11 is completely folded means a case where the seat cushion H1 reaches the stowed position. In this embodiment, the respective link member pieces 12, 13 constituting the respective link members 11 rotate to stow the seat body H, and when the seat cushion H1 reaches the stowed position, the lower end surface (the lower surface 33a of the facing portion 33) of the upper support member 31 abuts against the upper end surface (the upper surface 43a of the facing portion 43) of the lower support member 41. When the support members 31, 41 abut against each other in this way, the further relative rotation of the upper link member piece 12 to the lower link member piece 13 is regulated.

That is, in this embodiment, each of the support members 31, 41 supports the corresponding link member pieces 12, 13 and serve as stoppers which regulate the rotation amount of the link member pieces 12, 13. Accordingly, in this embodiment, it is possible to reduce the number of components compared to the configuration in which the member supporting the link member pieces 12, 13 is provided separately from the member regulating the rotation amount of the link member pieces 12, 13.

Figure 9:
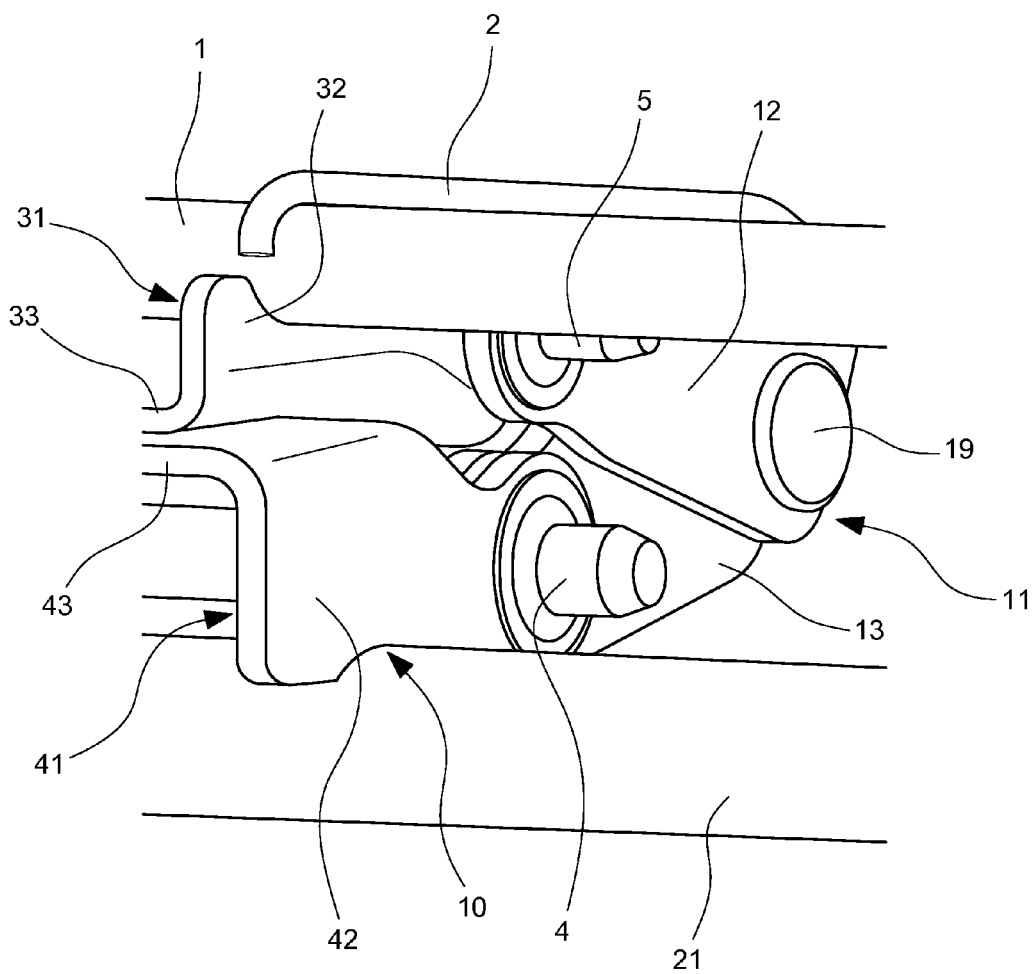
FIG. 9 is a perspective view diagram illustrating a state when the foot link unit according to the embodiment of the present invention is completely folded.

The upper end portion of the upper link member piece 12, that is, the end portion supported by the upper support member 31, is positioned at the upper position of the rear end portion of the link support portion 42 of the lower support member 41, as illustrated in FIG. 9, at the time when the upper support member 31 and the lower support member 41 abut against each other, that is, the seat cushion H1 reaches the stowed position. In this case, the rear end portion of the link support portion 42 of the lower support member 41 and the upper end portion of the upper link member piece 12 are separated from each other with some amount of clearance in the vertical direction.

Further, the lower end portion of the lower link member piece 13, that is, the end portion supported by the lower support member 41 is positioned at the lower position of the rear end portion of the link support portion 32 of the upper support member 31, as illustrated in FIG. 9, at the time when the upper support member 31 and the lower support member 41 abut against each other. In this case, the rear end portion of the link support portion 32 of the upper support member 31 and the lower end portion of the lower link member piece 13 are separated from each other with some amount of clearance in the vertical direction.

The spiral spring 6 is used to bias both the upper link member piece 12 and the lower link member piece 13 of each link member 11 to return both the upper link member piece 12 and the lower link member piece 13 to their original positions before the seat body H is stowed. That is, the spiral spring 6 applies a biasing force to each link member 11 to maintain the position of each link member 11 in the extended position, that is, the position illustrated in FIG. 6. Accordingly, for stowing the seat body H, each link member 11 is folded against the biasing force of the spiral spring 6, in other words, the upper link member piece 12 and the lower link member piece 13 are rotated.

Now, the configuration of the spiral spring 6 is described. The spiral spring 6 is an existing spiral spring of which one end portion is locked to the upper connection member 15 and the other end portion is locked to the lower connection member 16. The spiral spring 6 indirectly biases the upper link member piece 12, which is integrated with the upper connection member 15, by biasing the upper connection member 15. More specifically, the spiral spring 6 biases the portion of the upper connection member 15 which is positioned closer to the seat cushion H1 rearward. Because of the biasing force, the upper connection member 15 and the upper link member piece 12 are tilted somewhat rearward.

Meanwhile, the spiral spring 6 indirectly biases the lower link member piece 13 which is integrated with the lower connection member 16, by biasing the lower connection member 16. More specifically, the spiral spring 6 biases the portion which is positioned closer to the vehicle body floor in the lower connection member 16 rearward. Because of the biasing force, the lower connection member 16 and the lower link member piece 13 are tilted somewhat forward.

Because of the operation of the aforementioned spiral spring 6, each link member 11 is maintained in the extended position as long as no pulling force is applied from the driving force transmitting cable 3. As a result, the seat cushion H1 is maintained at the use position.

The spiral spring 6 having the aforementioned function is disposed while being coiled around the center portion of the connection shaft 19 disposed between the link members 11 as illustrated in FIG. 5. In this embodiment, since the spiral spring 6 is disposed taking advantage of the space around the connection shaft 19 in this way, it is possible to further efficiently suppress the size increase of the seat S.

In this case, the connection shaft 19 is attached to the center portion of the link member 11, that is, the connection portion between the upper link member piece 12 and the lower link member piece 13. The upper link member piece 12 and the lower link member piece 13 are attached to the end portion of the connection member 14 (specifically, the upper connection member 15 and the lower connection member 16) in the width direction of the seat S. Further, in this embodiment, each of the upper link member piece 12 and the lower link member piece 13 intersects with the end portion of the connection member 14 in the width direction of the seat S. That is, in this embodiment, the pair of upper link member pieces 12 and the upper connection member 15 form a substantially U-shape. Similarly, the pair of lower link member pieces 13 and the lower connection member 16 form a substantially U-shape.

Further, in this embodiment, the spiral spring 6 is disposed to be stowable within the U-shaped structure which is formed by the link member pieces 12, 13 and the corresponding connection members 15, 16. In other words, the spiral spring 6 is positioned between both end portions of the connection member 14 (specifically, the upper connection member 15 and the lower connection member 16) in the width direction of the seat S, and is disposed while being interposed between the pair of lower link member pieces 13 and between the pair of upper link member pieces 12. Since the spiral spring 6 is disposed taking advantage of the space between the link member pieces 12, 13 in this way, it is possible to further efficiently suppress the size increase of the seat S.

The aforementioned embodiment is merely an example that is provided to help understanding of the present invention, and does not limit the scope of the invention. The present invention may be modified or improved without departing from the spirit thereof and the present invention, of course, includes the equivalent thereto. Further, the aforementioned material, shape, and the like are merely examples for exhibiting the effect of the present invention, and do not limit the scope of the present invention.

Figure 10:
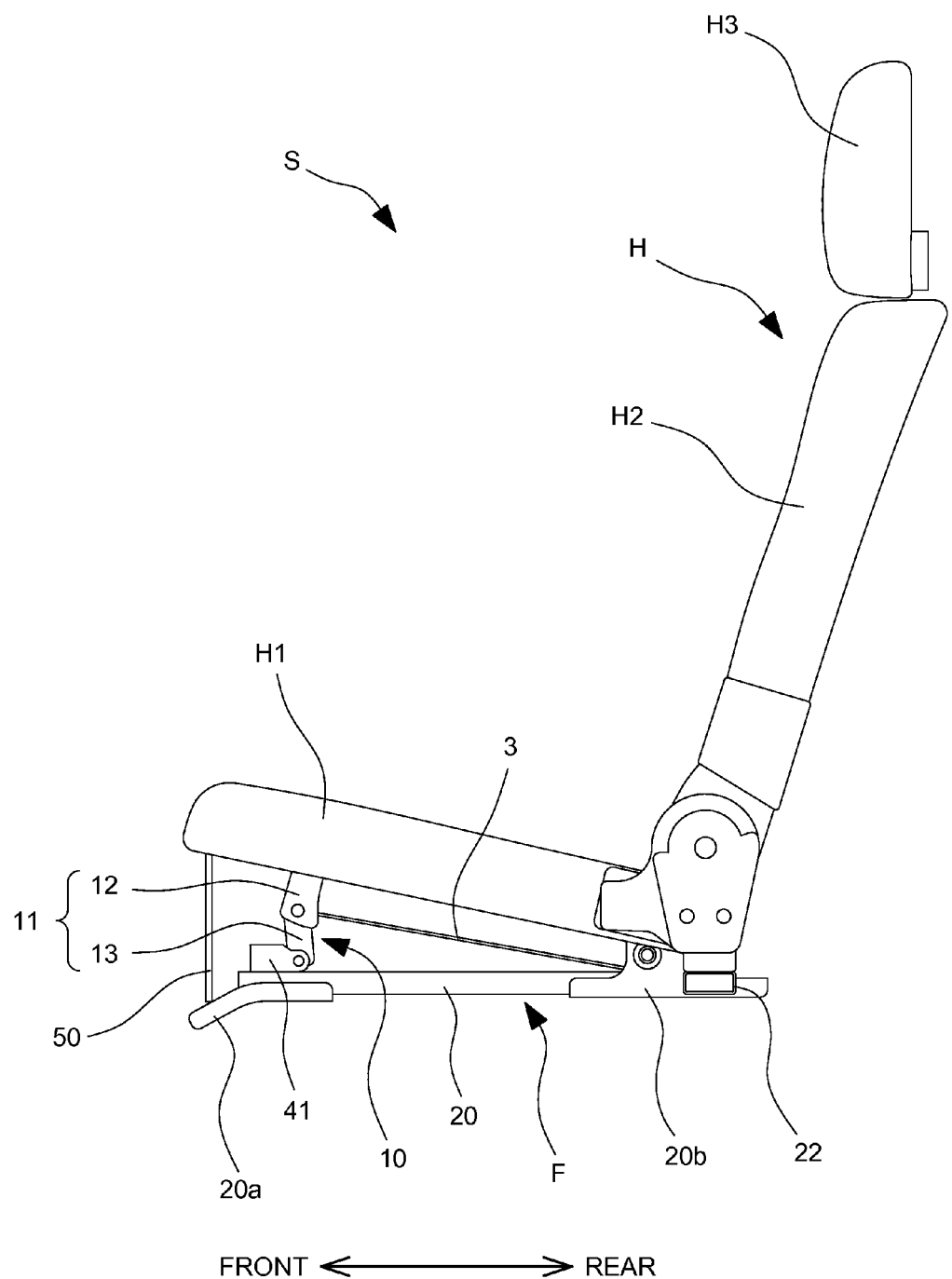
FIG. 10 is a side view diagram illustrating a modified example of the vehicle seat of the present invention.

Further, in the aforementioned embodiment, when the foot link unit 10 is seen from the front in a state where the seat S is in use, most part of the foot link unit is exposed as illustrated in FIG. 1. However, the present invention is not limited thereto, and as illustrated in FIG. 10, a cover member 50 may be provided at the front position of the foot link unit 10. Furthermore, the cover member 50 may be movable, and when the link member 11 of the foot link unit 10 is folded so that the seat cushion H1 is directed toward the stowed position, the cover member 50 may swing so that the lower end portion of the cover member 50 moves upward. In such a configuration, it is possible to suppress the interference of the cover member 50 with the operation of the link member 11.

Furthermore, the cover member 50 may be formed by an elastically deformable material, to be curved when the link member 11 is folded. In such a configuration, it is possible to further effectively suppress the interference of the cover member 50 with the operation of the link member 11. In order to exhibit such an effect, a rubber member or a fabric cloth may be used as a material of the cover member 50.

All references, including publications, patent applications, and patents, cited herein are hereby incorporated by reference to the same extent as if each reference were individually and specifically indicated as incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The embodiments may be described in terms of functional block components and various processing steps. Such functional blocks may be realized by any number of components that perform the specified functions.

The particular implementations shown and described herein are illustrative examples of the invention and are not intended to otherwise limit the scope of the invention in any way. For the sake of brevity, conventional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings. Expressions such as "at least one of," when preceding a list of elements, modify the entire list of elements and do not modify the individual elements of the list.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

The words "mechanism" and "element" are used herein generally and are not limited solely to mechanical embodiments. Numerous modifications and adaptations will be readily apparent to those skilled in this art without departing from the spirit and scope of the invention.

What is claimed is:

1. A vehicle seat with a seat cushion on which a passenger sits, the vehicle seat comprising:
   a stowable seat body; and
   at least one rotation member that is attached to the seat cushion to rotate about a rotation shaft provided along a width direction of the seat body for shifting the seat cushion to a stowed position in stowing the seat body;
   wherein:
   the at least one rotation member is positioned below the seat cushion and attached to a center portion of the seat cushion in the width direction;
   the seat cushion comprises a seat cushion frame;
   the at least one rotation member comprises:
       a lower rotation member piece that rotates about a lower rotation shaft as the rotation shaft; and
       an upper rotation member piece that is connected to the lower rotation member piece through a connection shaft provided along the lower rotation shaft to rotate about the connection shaft;
   the vehicle seat further includes:
       a lower support member that is fixed to a lower position of the seat cushion frame to rotatably support the lower rotation member piece about the lower rotation shaft; and
       an upper support member that is fixed to the seat cushion frame to rotatably support the upper rotation member piece about an upper rotation shaft provided along the connection shaft; and
   when the seat cushion reaches the stowed position, the upper support member abuts against the lower support member.

2. The vehicle seat according to claim 1, wherein:
   the at least one rotation member comprises a plurality of rotation members;
   the plurality of rotation members are attached to the center portion of the seat cushion in the width direction while being separated from each other in the width direction;
   the vehicle seat further includes a connection member that extends in the width direction to connect the plurality of rotation members to each other;
   the seat cushion frame has a gap between front and rear end portions in a front to back direction of the seat body;
   the seat cushion includes:
       a frame side connector that is disposed in the gap to connect the front and rear end portions of the seat cushion frame to each other; and
   the frame side connector is disposed in a region between vertical lines extending from outer width-wise edges of the connection member.

3. The vehicle seat according to claim 1, wherein:
a concavo-convex pattern is formed in at least any one of an abutting surface provided in the upper support member against the lower support member and an abutting surface provided in the lower support member against the upper support member.

4. The vehicle seat according to claim 2, wherein:
in the upper rotation member pieces provided in each of the plurality of rotation members, one of the upper rotation member pieces that is positioned closest to one end portion in the width direction is positioned closer to the one end portion in the width direction than any one of the lower rotation member pieces provided in each of the plurality of rotation members; and
in the upper rotation member pieces provided in each of the plurality of rotation members, one of the upper rotation member pieces that is positioned closest to an other end portion in the width direction is positioned closer to the other end portion in the width direction than any one of the lower rotation member pieces provided in each of the plurality of rotation members.

5. The vehicle seat according to claim 2, wherein:
an end surface of the lower support member provided closer to one end portion in the width direction is positioned closer to the one end portion in the width direction than any one of the lower rotation member pieces provided in each of the plurality of rotation members; and
an end surface of the lower support member provided closer to an other end portion in the width direction is positioned closer to the other end portion in the width direction than any one of the lower rotation member pieces provided in each of the plurality of rotation members.

6. The vehicle seat according to claim 2, wherein:
a pair of the rotation members is attached to the center portion of the seat cushion in the width direction while being separated from each other in the width direction;
the connection shaft extends from a connection portion between the upper rotation member piece and the lower rotation member piece of one rotation member of the pair of rotation members to a connection portion between the upper rotation member piece and the lower rotation member piece of an other rotation member;
the vehicle seat further includes a spiral spring that biases both the upper rotation member piece and the lower rotation member piece to return both the upper rotation member piece and the lower rotation member piece to their original positions before the seat body is stowed; and
the spiral spring is disposed while being coiled around the connection shaft.

7. The vehicle seat according to claim 6, wherein:
the lower rotation member piece and the upper rotation member piece intersecting with both end portions of the connection member in the width direction are attached to the both end portions; and
the spiral spring is positioned between the both end portions of the connection member in the width direction and is interposed between the lower rotation member pieces and between the upper rotation member pieces.

8. The vehicle seat according to claim 1, further comprising:
- a plurality of seat fixing members that are provided at the lower position of the seat cushion to fix the seat body while being separated from each other in the width direction; and
- a seat side connection member that connects the seat fixing members to each other in the width direction;
- wherein the lower support member is fixed to the seat side connection member.

9. The vehicle seat according to claim 3, wherein:
- in the upper rotation member pieces provided in each of the plurality of rotation members, one of the upper rotation member pieces that is positioned the closest to one end portion in the width direction is positioned closer to the one end portion in the width direction than any one of the lower rotation member pieces provided in each of the plurality of rotation members; and
- in the upper rotation member pieces provided in each of the plurality of rotation members, one of the upper rotation member pieces that is positioned the closest to the other end portion in the width direction is positioned closer to the other end portion in the width direction than any one of the lower rotation member pieces provided in each of the plurality of rotation members.

10. The vehicle seat according to claim 1, wherein:
- the at least one rotation member comprises a plurality of rotation members;
- the plurality of rotation members are disposed being separated from each other in the width direction; and
- the vehicle seat further comprises:
  - a spiral spring that is disposed in a space between the plurality of rotation members and biases the plurality of rotation members to return the plurality of rotation members to their original position before the seat body is stowed.

11. The vehicle seat according to claim 1, wherein:
- the at least one rotation member comprises a plurality of rotation members;
- the vehicle seat further comprises:
  - a lower connection member that extends in the width direction to connect a plurality of the lower rotation member pieces each associated with a respective rotation member of the plurality of rotation members to each other; and
  - an upper connection member that extends in the width direction to connect a plurality of the upper rotation member pieces each associated with a respective rotation member of the plurality of rotation members to each other.

* * * * *